United States Patent [19]

Maase et al.

[11] Patent Number: 5,450,302
[45] Date of Patent: Sep. 12, 1995

[54] EXTERIOR HIGH INTENSITY DISCHARGE ILLUMINATION SYSTEM AND METHOD FOR USE

[75] Inventors: Hanron T. Maase; William R. Taylor, both of Champaign, Ill.

[73] Assignee: U.S. Army Corps of Engineers as represented by the Secretary of the Army, Washington, D.C.

[21] Appl. No.: 111,556

[22] Filed: Aug. 25, 1993

[51] Int. Cl.⁶ ............................................. F21V 23/00
[52] U.S. Cl. .................... 362/276; 362/431; 362/802; 315/149
[58] Field of Search ............... 362/276, 295, 265, 431, 362/802; 315/149

[56] References Cited

U.S. PATENT DOCUMENTS

| | | | |
|---|---|---|---|
| 3,562,510 | 2/1971 | Baldwin | 362/368 X |
| 4,023,034 | 5/1977 | Schacht | 362/276 X |
| 4,410,930 | 10/1983 | Yachabach | 362/276 X |
| 4,587,417 | 5/1986 | Duve et al. | 315/360 X |
| 4,631,675 | 12/1986 | Jacobsen et al. | 362/276 X |
| 4,691,341 | 9/1987 | Knoble et al. | 315/360 X |
| 4,991,054 | 2/1991 | Walters | 315/159 X |
| 5,149,188 | 9/1992 | Robbins | 362/802 X |
| 5,161,874 | 11/1992 | Benes | 362/431 X |

*Primary Examiner*—Stephen F. Husar
*Attorney, Agent, or Firm*—Luther A. Marsh

[57] ABSTRACT

An outdoor illumination system having a dimmed and bright mode and is a microprocessor-based, dimming photocontrol unit for reducing the energy consumed by single, outdoor high intensity discharge light fixtures by combining a dimming and photocontrol circuit into one unit which plugs directly into the existing photocontrol jack located on most outdoor high intensity discharge fixtures.

26 Claims, 3 Drawing Sheets

EXTERIOR HIGH INTENSITY DISCHARGE ILLUMINATION SYSTEM AND METHOD FOR USE

BACKGROUND OF THE INVENTION

1. Field of the Invention

The present invention relates to illumination systems and more particularly to exterior high intensity discharge (HID) illumination systems which are responsive to changes in time of day and in ambient light.

2. Brief Description of the Prior Art

Conventionally, dimming of outdoor HID light fixtures such as those used in street lights and for parking lots and loading docks is performed by a dimming unit mounted in an enclosure separate from the fixture. Typically such enclosures are located indoors. These dimming units are designed to control several lights simultaneously.

There are two techniques commonly used to dim HID light sources. The first makes use of a solid-state switch such as a triac or silicon controlled rectifier and dims the lights by turning the power on and off 120 times a second. Power flow is varied by controlling the amount of time the power is on versus the amount of time the power is off. The longer the power is left off during each half cycle, the more the lights are dimmed. This control method is commonly referred to as phase control. The second technique requires the use of an electronic dimming ballast that allows the ballast to be internally addressed to vary lamp arc current and, hence, the lamp's light output.

On/off control for single outdoor HID fixtures is frequently performed by a photocontrol unit mounted atop the fixture. The photocontrol units sense ambient light level and thereby turn the light on at dusk and off at dawn. A particular prior art photocontrol unit uses a timer to allow the user to predetermine when the light should turn on and off each night i.e., permits the light to be turned on and off at times other than dusk and dawn. Prior art photocontrol units have been capable of on/off control only but have not allowed for dimming.

One disadvantage of the prior art HID light dimming products is a lack of flexibility. Prior art dimming units are conventionally designed to dim several lights at once. There are many applications where it is desired that only a small portion of the lights in a space be dimmed or that the lights be dimmed to different levels. Using such conventional units for these applications would require extensive rewiring of the lighting circuit, and hence make it difficult to make future changes. Also, the control circuitry in the prior art dimming units requires a continuous supply of electrical power. Hence, such dimming units are difficult use in applications where power is not accessible during the day. For example, the power fed into some street light circuits is controlled by a single photocontrol unit, and during the day power is not available at the light fixture. Another disadvantage to the prior art units is their size. The size of the existing dimming units usually prevents them from being mounted directly to the fixture where wiring is more readily accessible for installation and maintenance. Finally the prior art units are often costly. The electrical capacity of the existing dimming units is generally sized to provide dimming for several light fixtures simultaneously. The extra cost required to provide this extra capacity makes these units impractical for dimming single fixtures. Also, for dimming units that require a dimming ballast to be used, there is a considerable cost associated with replacing the existing lamp ballasts, making these units impractical in most retrofit applications.

It is, therefore, the object of the present invention to provide an outdoor HID lighting system which can be dimmed in a simple, cost effective manner.

SUMMARY OF THE INVENTION

The illumination system of the present invention is a microprocessor-based, dimming/photocontrol unit for reducing the energy consumed by single, outdoor HID light fixtures. This device overcomes the disadvantages of the prior art by combining a dimming and photocontrol circuit into one unit which plugs directly into the existing photocontrol jack found on most outdoor HID light fixtures.

The system includes an electrical lamp which is connected in circuit to an alternating current power source and a photoelectric control element, a microcontroller for inputting and storing data concerning times of operation and a bilateral switching device. The lamp has two modes of operation, a lower intensity mode referred to herein as a "dimmed mode" and a higher intensity mode referred to herein as a "full bright" mode. The lamp is also contained within a light fixture. There is an individual photoelectric control unit and a microcontroller for each such fixture and these elements are mounted adjacent to and preferably directly on the fixtures. A time period during which the lamp should be dimmed each day is also inputed into and stored in the microcontroller. This period of time will be referred to herein as the "preselected daily chronological period". When the lamp is energized during the preselected daily chronological period it will be in its dimmed mode. Outside that period the lamp will be in its full bright mode when it is energized. It is also possible to store non-volatile memory data such as lengths of nights for previous nights.

It would, therefore, be possible for the user to input specific times each day during which he wished the lamp to operate in the dimmed mode or, in other words, when the daily chronological period would occur. For example, the lamp might be on full bright from dusk until 10:00 p.m. after which it would operate at a dimmed level until 4:00 a.m. after which it would operate at full bright until dawn. In this example, the daily chronological period would be 10:00 p.m. until 4:00 a.m. The lamp would, of course, be turned on by the photocontrol unit at dusk and turned off by that unit at dawn.

Alternately the non-volatile memory data storage capability would allow the times of dusk and dawn to be stored from the previous day so that the user would be able to input specific lengths of time after dusk and before dawn at which he wished the daily chronological period to begin and end. For example, the user might input that the lights will be dimmed, and the daily chronological period begin 2 hours after dusk and that they remain at that level until they would return to full bright 2 hours before dawn, or in other words the daily chronological period would be from 2 hours after dusk to 2 hours before dawn.

It is also possible for the user to input data concerning the level of intensity to which the lamp may be dimmed during the dimmed mode, and the lamp may be dimmed completely to a "no light" level for certain situations.

BRIEF DESCRIPTION OF THE DRAWINGS

The illumination system of the present invention is further described with reference to the accompanying drawings in which.

DETAILED DESCRIPTION OF THE PREFERRED EMBODIMENTS

Figure 1:
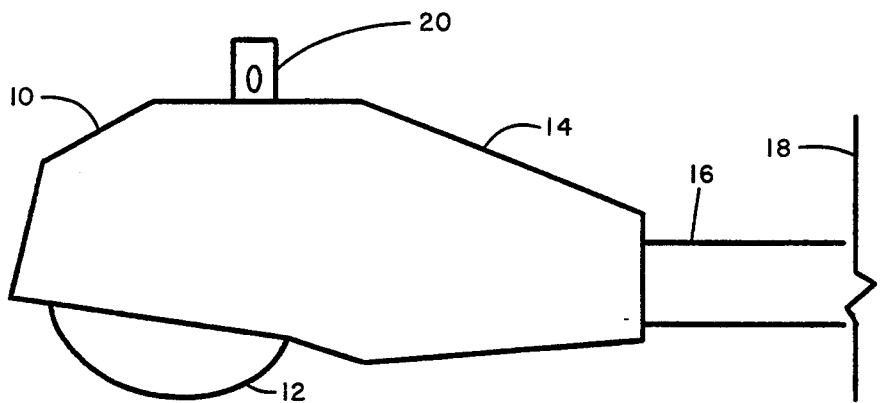
FIG. 1 is side elevational view of a preferred embodiment illumination system of the present invention.

Referring to FIG. 1, the light fixture is shown generally at numeral 10 wherein lamp 12 is enclosed by cover 14 which is attached by means of arm 16 to pole 18 which is shown in fragment. A housing 20 for the dimming and photocontrol elements plugs into the photocontrol jack on the light fixture. It will be understood that other details of the structure of the fixture are conventional as is, for example, generally shown in U.S. Pat. No. 3,562,510.

The dimming and photocontrol unit will preferably be designed to retrofit the photocontrol unit commonly used with outdoor HID light fixtures. Preferably it plugs into the existing photocontrol jack located on the top of the fixture. In one prototype embodiment it is about 2.75 inches in diameter and 4.25 inches in height which is about twice as tall and about the same diameter as many prior art photocontrol units. However, it should be mentioned that the height of the prototype was not minimized, and may have been reduced by using a flatter style transformer and by possibly positioning the electrical components in other configurations.

Figure 2:
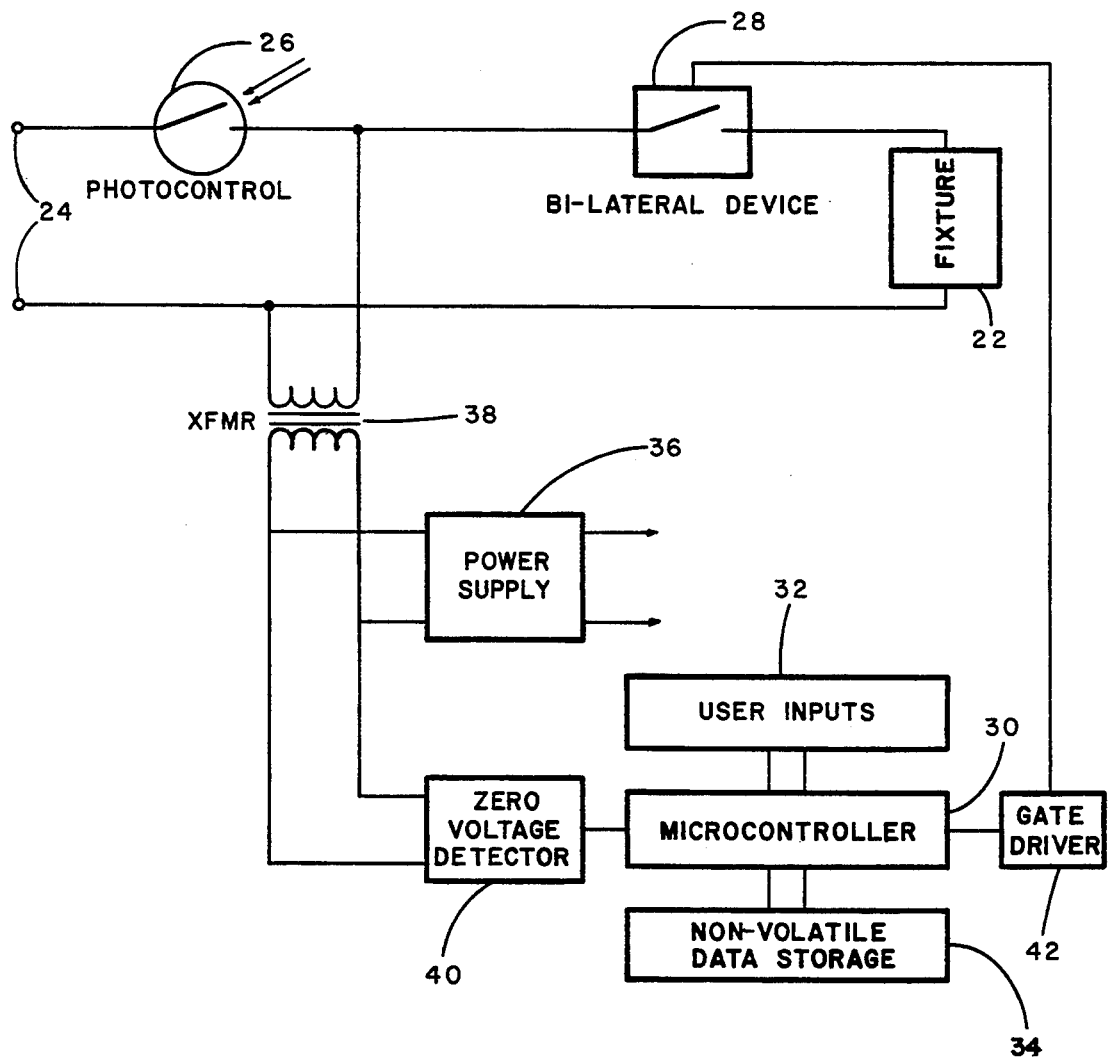
FIG. 2 is a block diagram of the various functional elements of the illumination device shown in FIG. 1.
Figures 4A, 4B, 4C:
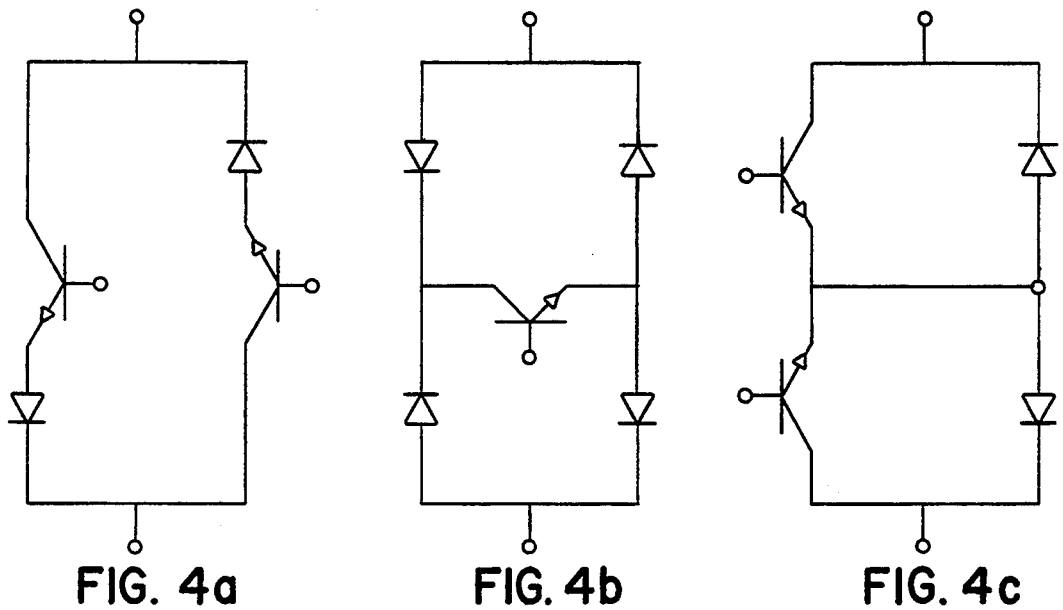
FIGS. 4a, 4b and 4c are schematic drawings of suitable bilateral switches.
Figure 5:
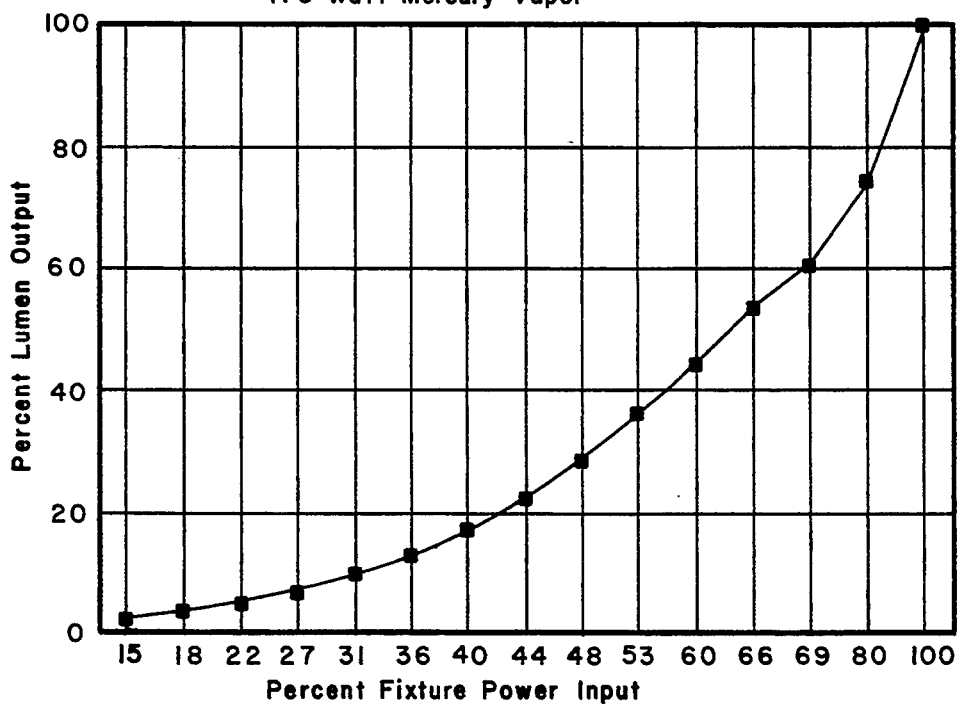
FIG. 5 is a graph showing percent lumen output vs. percent power input measured on an 175 watt mercury vapor lamp incorporated in a device of the present invention.

Referring to FIG. 2, the light fixture 22 containing a lamp is energized by alternating current power source 24 and is in circuit with photocontrol element 26 and bilateral switching is interposed between the bilateral switching device and the microcontroller 62 to which there is connected an electrical erasable programmable read only memory (EEPROM) available from National Semi-conductor as 9306EN and a user input dip switch 64 including a pull down resistor 65. A 5 volt direct current power supply 76 is connected by way of resistor 78 and 80 to voltage comparator 82 (311) which is connected after pull up resistor 84 to the microcontroller. A superimposed alternating current is induced at transformer 86 and passes through a full wave bridge rectifier 88 and resistors 90 and 92, diode 94, and capacitors 96, 98 and 100. Suitable alternative bilateral switches for use herein are shown in FIGS. 4a, 4b and 4c.

TEST

Figure 3:
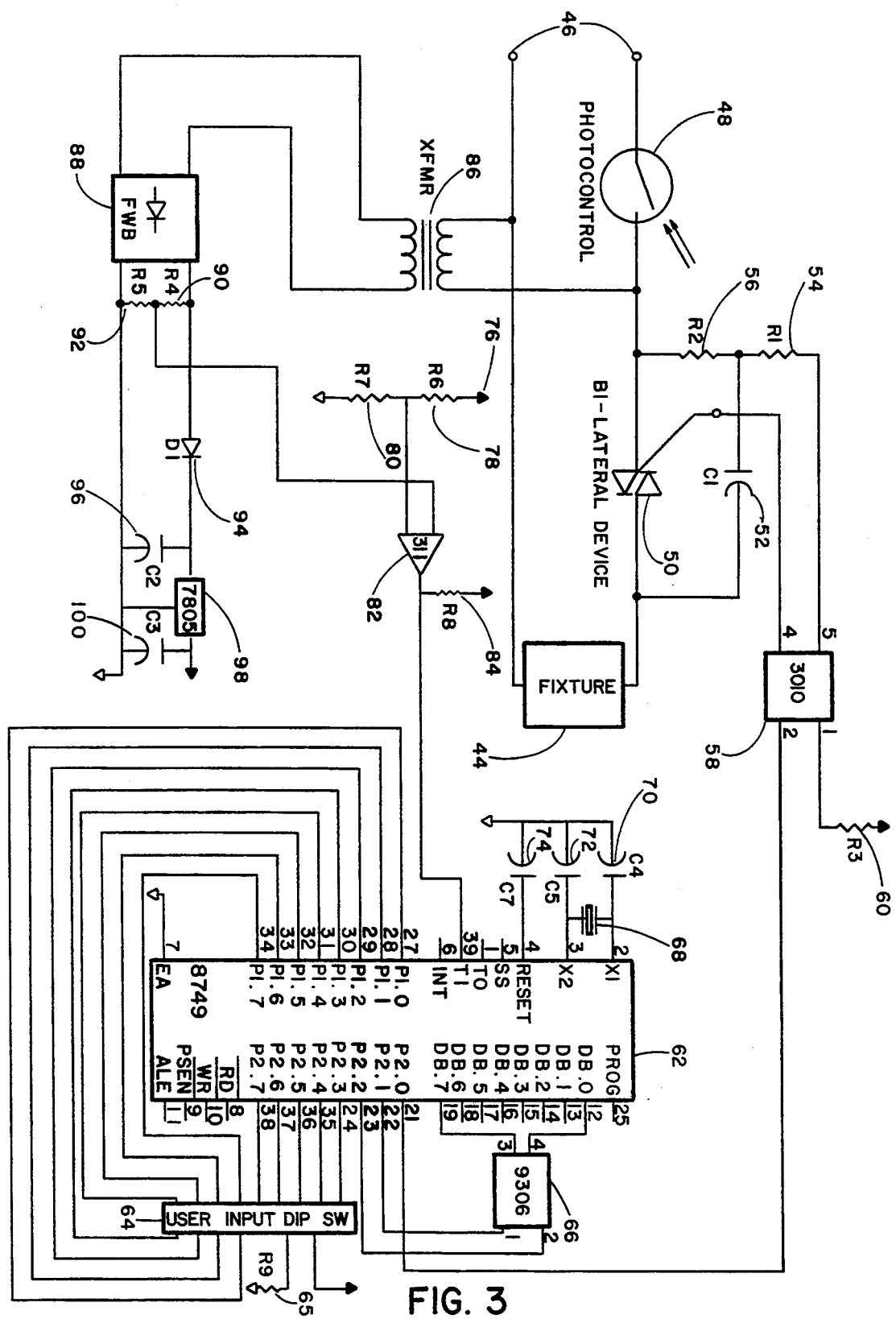
FIG. 3 is a more detailed schematic drawing and the various functional elements of the device shown in FIG. 2.

A prototype of the device shown in FIG. 3 was constructed. All of the electronic components in the prototype were rated to operate properly in the temperature range of −40 degrees to +85 degrees Celsius (−40 degrees to 185 degrees Fahrenheit). The prototype was built to allow the user to input how long the light should remain at full bright after dusk and to what level the light should be dimmed after the full-bright duration. The prototype was tested on a 175 watt mercury vapor fixture and a plot of percent light output versus percent fixture input power is shown in FIG. 4. The prototype was programmed to use phase control to condition the power to the fixture, and the test results were as expected for this control and fixture type, based on the dimming efficacy curves found in the IES Lighting Handbook. An EEPROM was used to store information concerning the length of night, and held the information even when power was removed. As a result of using the EEPROM, the device could be adapted to length-of-night changes without having to be powered 24 hour a day; the device requires power only at night.

Although the invention has been described with a certain degree of particularity, it is to be understood that the present disclosure has been made only as an example and the scope of the invention is defined by what is hereafter claimed.

What is claimed is:

1. An outdoor illumination system comprising:
   (a) an electrical lamp illumination means being operable in a dimmed mode and a full bright mode and being contained in a light fixture;
   (b) electrical power supply means connected in circuit to said electrical lamp illumination means;
   (c) means mounted adjacent said fixture for sensing when ambient light intensity is higher than a preselected level and for de-energizing the electrical lamp at said level;
   (d) means mounted adjacent said fixture for inputting and storing data concerning a preselected daily chronological period inside of which period the electrical lamp illuminations means should be dimmed; and
   (e) bilateral switching means for reducing electrical power to the electrical lamp illumination means based on instructions from said means for inputting and storing data concerning a preselected daily chronological period as to whether time is within said preselected chronological period, such that said instructions will result in the electrical lamp illumination means being operated in its dimmed mode unless said lamp illumination means is de-energized by said means for sensing when ambient light intensity is higher than a preselected level as a result of ambient light intensity being higher than said preselected level.

2. The illumination system of claim 1 wherein the electrical lamp illumination means is operated in its full bright mode when time is outside of its preselected daily chronological period unless said lamp illumination means is de-energized by said means for sensing when ambient light intensity is higher than a preselected level as a result of ambient light intensity being higher than said preselected level.

3. The illumination system of claim 1 wherein said means for inputting and storing data concerning a preselected daily chronological period contains means for inputting and storing data concerning the level to which the electrical light illumination means is to be dimmed.

4. The system of claim 3 wherein the electrical lamp illumination means can be dimmed to no light.

5. The illumination system of claim 1 wherein said means for sensing when ambient light intensity is higher than a preselected level and said means for inputting and storing data concerning a preselected daily chronological period are mounted directly on the fixture.

6. The illumination system of claim 5 wherein said means for storing said preselected daily chronological period data contains a microcontroller.

7. The illumination system of claim 6 wherein said means for storing said daily chronological period data includes means for a user to input data.

8. The illumination system of claim 7 wherein the means for storing said preselected daily chronological period data includes a non-volatile memory.

9. The illumination system of claim 8 wherein said non-volatile memory stores length-of-night data.

10. The illumination system of claim 9 wherein said means for storing daily chronological period data includes a direct current electrical power source.

11. The illumination system of claim 10 wherein said means for storing daily chronological period data includes a means for inducing an alternating current voltage from an alternating current electrical power source.

12. The illumination system of claim 11 wherein said alternating current voltage introduced to a zero voltage detector means before being introduced to the microcontroller.

13. The illumination system of claim 12 wherein the microcontroller is connected in circuit to the bilateral switching means.

14. The illumination system of claim 13 wherein a gate driver means is interposed between the microcontroller and the bilateral switching means to signal the bilateral switching means to turn on and off.

15. The illumination system of claim 14 wherein the electrical power supply means in is an alternating current electrical power supply means.

16. The illumination system of claim 15 wherein said alternating current electrical power supply means is used to induce said alternating current which is to be used by the direct current power supply means and the zero voltage detector means.

17. The illumination system of claim 16 wherein the means for sensing when ambient light intensity is higher than a predetermined level is in circuit with the electrical lamp illumination means.

18. The illumination system of claim 17 wherein the bilateral switching means is in circuit with the electrical lamp illumination means and the means for sensing when ambient light intensity is higher than a predetermined level.

19. A method for operating an outdoor illumination system comprising:

(a) providing an electrical lamp illumination means being operable in a dimmed mode and a full bright mode and being contained in a light fixture;
(b) providing an electrical power supply means connected in circuit to said electrical lamp illumination means;
(c) sensing by means mounted adjacent said fixture when ambient light intensity is higher than a preselected level and de-energizing the electrical lamp at said level;
(d) inputting and storing data by means mounted adjacent said fixture concerning a preselected daily chronological period inside of which period the electrical lamp illuminations means should be dimmed; and
(e) providing bilateral switching means for reducing electrical power to the electrical lamp illumination means based on instructions from means for inputting and storing data concerning a preselected chronological period as to whether time is within said preselected chronological period, such that said instructions will result in the electrical lamp illumination means being operated in its dimmed mode unless said lamp illumination means is de-energized by said means for sensing when ambient light intensity is higher than a preselected level as a result of ambient light intensity being higher than said preselected level.

20. The method claim 19 wherein the electrical lamp illumination means is operated in its full bright mode when time is outside of its preselected daily chronological period unless said lamp illumination means is de-energized in step (c) as a result of ambient light intensity being higher than said preselected level.

21. The method of claim 19 wherein in step (d) data concerning the level to which the electrical light illumination means is to be dimmed is inputted and stored.

22. The method of claim 21 wherein the electrical lamp illumination means can be dimmed to no light.

23. The method of claim 19 wherein the means for sensing ambient light intensity employed in step (c) and the means for storing the preselected chronological period stored in step (d) are mounted directly on the fixture.

24. The method of claim 19 wherein said preselected daily chronological period is stored by means of a microcontroller.

25. The method of claim 19 wherein the lamp is operated in the dimmed mode during the daily chronological period.

26. The method of claim 25 wherein the lamp is operated in the full bright mode immediately before and after the daily chronological period.

* * * * *

UNITED STATES PATENT AND TRADEMARK OFFICE
CERTIFICATE OF CORRECTION

PATENT NO. : 5,450,302
DATED : September 12, 1995
INVENTOR(S) :

It is certified that error appears in the above-identified patent and that said Letters Patent is hereby corrected as shown below:

On the title page, item [75] inventors, "Hanron T. Maase" should read --Hannon T. Maase--.

Signed and Sealed this

Eighteenth Day of June, 1996

Attest:

BRUCE LEHMAN

*Attesting Officer*     *Commissioner of Patents and Trademarks*